(12) United States Patent
Kunze et al.

(10) Patent No.: US 6,764,265 B2
(45) Date of Patent: Jul. 20, 2004

(54) EROSION RESISTANT SLIT VALVE

(75) Inventors: Charles S. Kunze, Cupertino, CA (US); Andrew V. Le, San Jose, CA (US); Muhammad Rasheed, Fremont, CA (US)

(73) Assignee: Applied Materials Inc., Santa Clara, CA (US)

( * ) Notice: Subject to any disclaimer, the term of this patent is extended or adjusted under 35 U.S.C. 154(b) by 157 days.

(21) Appl. No.: 10/041,291

(22) Filed: Jan. 7, 2002

(65) Prior Publication Data

US 2003/0129044 A1 Jul. 10, 2003

(51) Int. Cl.$^7$ ............................................. B65G 1/133
(52) U.S. Cl. ..................... 414/217.1; 251/193; 251/324; 414/217; 414/939
(58) Field of Search ............................. 414/217, 217.1, 414/193, 939; 251/324

(56) References Cited

U.S. PATENT DOCUMENTS

| | | | |
|---|---|---|---|
| 4,065,097 A | * 12/1977 | Timin | 251/228 |
| 4,721,282 A | * 1/1988 | Shawver et al. | 251/62 |
| 4,889,319 A | * 12/1989 | Phillips et al. | 251/368 |
| 5,226,632 A | 7/1993 | Tepman et al. | |
| 5,363,872 A | 11/1994 | Lorimer | |
| 5,520,142 A | * 5/1996 | Ikeda et al. | 118/733 |
| 5,934,646 A | * 8/1999 | Tamura et al. | 251/193 |
| 6,045,620 A | 4/2000 | Tepman et al. | |
| 6,056,267 A | * 5/2000 | Schneider | 251/204 |
| 6,089,543 A | 7/2000 | Freerks | |
| 6,192,827 B1 | 2/2001 | Welch et al. | |
| 6,288,368 B1 | * 9/2001 | Kawada et al. | 219/405 |
| 6,291,814 B1 | 9/2001 | Chuang et al. | |

FOREIGN PATENT DOCUMENTS

WO  WO 01/55628 A1  8/2001

OTHER PUBLICATIONS

Greentweed.com, Technical Information Bulletin, Website article, Nov. 12, 2001, http://greentweed.com.

* cited by examiner

Primary Examiner—Thomas J. Brahan
(74) Attorney, Agent, or Firm—Townsend & Townsend & Crew

(57) ABSTRACT

Embodiments of the present invention provide structures for reducing erosion of a slit valve utilized in the fabrication of semiconductor devices. Specifically, non-metallic slit valve components such as a compressible sealing member and a barrier that assist in sealing the valve closure against the slit valve seat, are positioned on the valve seat rather than on the valve closure. This orientation removes the seal and the seal barrier from the direct line of sight of the plasma within the processing chamber, reducing exposure of the sealing member and seal barrier slit valve components to erosion and thereby extending the lifetime of the valve.

12 Claims, 4 Drawing Sheets

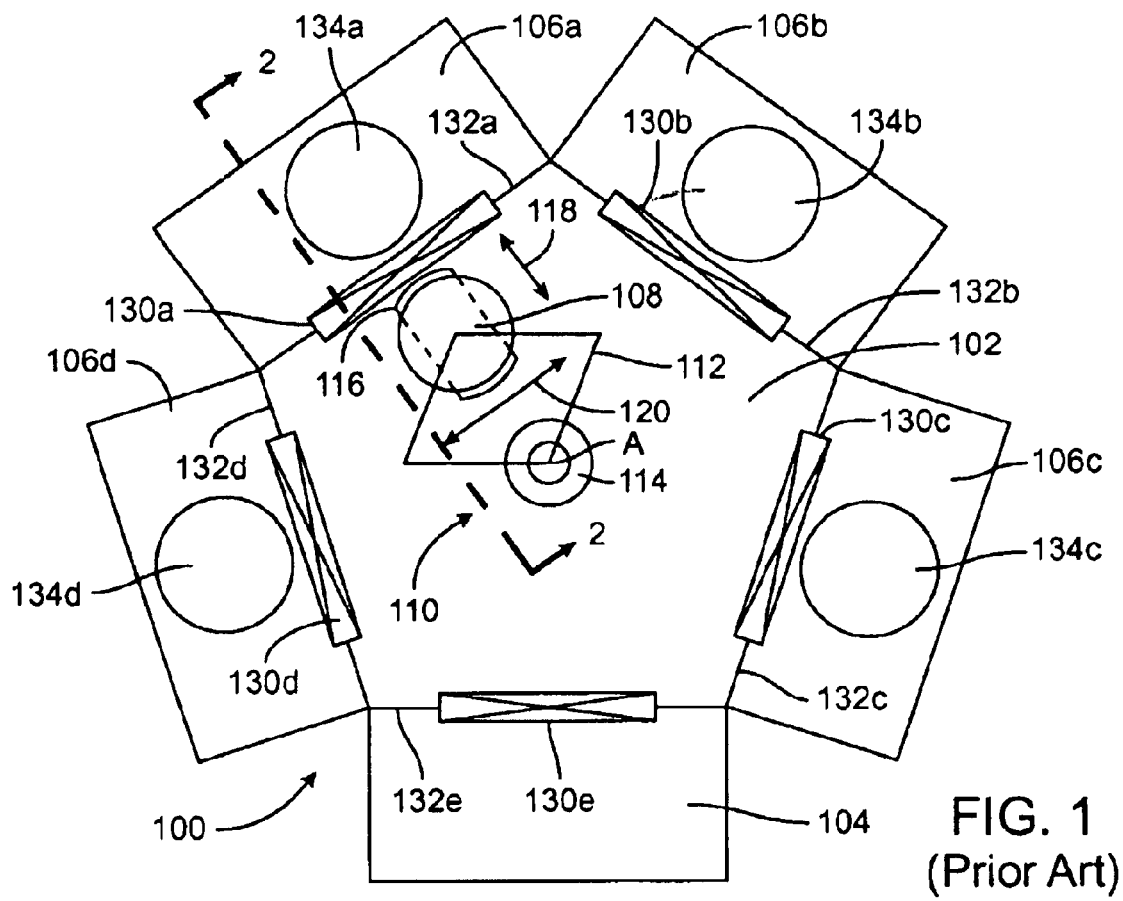
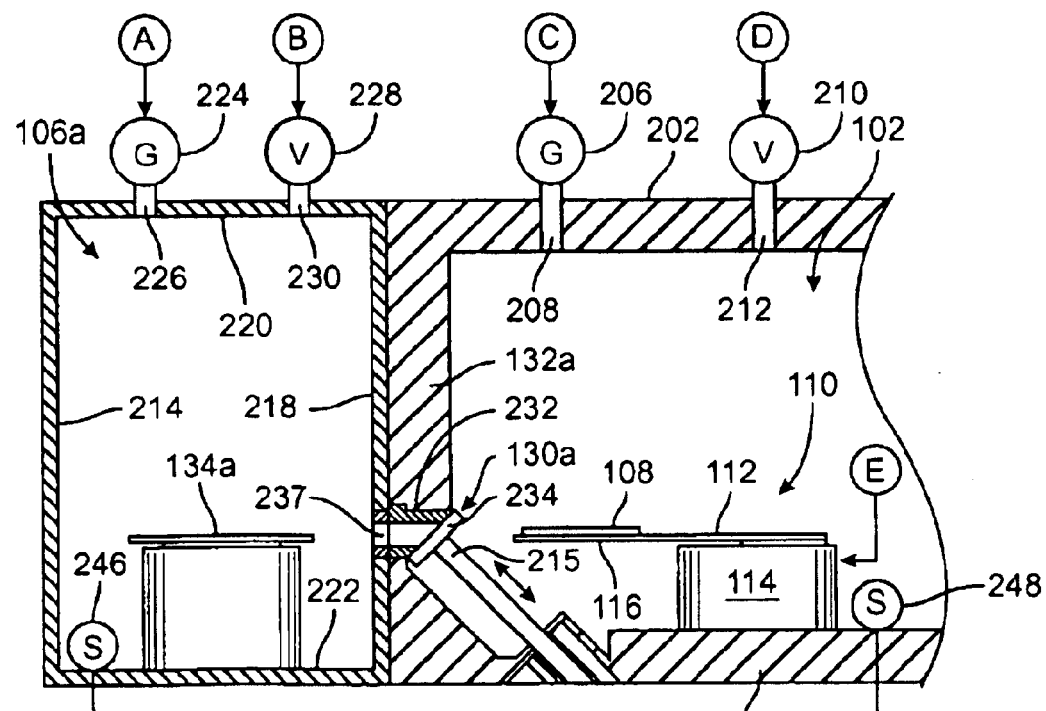
FIG. 1 (Prior Art)
FIG. 2 (Prior Art)

EROSION RESISTANT SLIT VALVE

BACKGROUND OF THE INVENTION

Various types of semiconductor manufacturing equipment are used to process semiconductor wafers during the manufacturing of integrated circuits (IC's). For example, chemical vapor deposition (CVD) systems are used to deposit dielectric and conductive layers over a wafer, plasma etch systems are used to etch a wafer or a layer formed over the wafer, and physical vapor deposition or "sputter" systems are used to physically deposits conductive layers over a wafer. These various processes are usually performed within sealed processing chambers so that the processing conditions can be tightly controlled.

A common way of transferring a wafer into a processing chamber and then subsequently removing it is through a "slit valve" in a wall of the processing chamber. A slit valve generally includes an elongated, usually horizontal, aperture formed in the wall. The aperture is sufficiently wide and high to permit the passage of a semiconductor wafer supported by the blade of a robotic wafer handling arm, and is surrounded by a valve seat. An elongated valve closure selectably engages the seat to close the aperture or disengages from the seat to open the aperture.

When the slit valve is closed, a gas-tight seal is required in order to isolate the chamber from external influences. This usually requires an elastomeric gasket or seal, such as an O-ring seal; disposed between the valve seat and the closure. Since the pressure on one side of the slit valve can be as high as atmospheric pressure, while the pressure on the other side of the slit valve can be as low as $10^{-8}$ torr, one atmosphere of pressure is often applied to the closure to ensure that the slit valve does not leak even under the most adverse of conditions. This amount of pressure tightly compresses the O-ring seal between the closure door and the valve seat.

FIG. 1 is a plan view of a prior art multiple chamber semiconductor processing system 100. System 100 includes a central wafer handling chamber 102, a wafer cassette loading/unloading (load lock) chamber 104, and a number of wafer processing chambers 106a–106d. System 100 is typically designed to process a single wafer 108 at a time within any one of the processing chambers 106.

Central wafer handling chamber 102 is provided with a computer controlled robotic wafer handler 110 which can support and move the wafer 108. A typical wafer handler 110 includes a "frog's leg" assembly 112 which is coupled at one end to a motor assembly 114 and, at the other end, to a wafer support blade 116. The motor assembly 114 allows the blade 116 to be rotated around an axis A of the motor assembly 114 and also to be moved radially in and out relative to the axis A as indicated by an arrow 118, by opening and closing the "frog's leg" assembly 112 in the direction of an arrow 120. These two degrees of movement allow the wafer handler 110 to move the wafer 108 into and out of the loading/unloading chamber 104 and the processing chambers 106a–106d.

Wafer handlers, such as the handler 110, are commercially available from such companies as Applied Materials of Santa Clara, Calif.

Central wafer handling chamber 102 is pentagonal in shape to accommodate the four processing chambers 106a–106d and the loading/unloading chamber 104. A slit valve assembly is disposed in a wall of each of the chambers 104, 106a–106d. Thus, a slit valve assembly 130a is disposed in a chamber wall 132a that forms a boundary between the handling chamber 102 and the processing chamber 106a. Also, a plurality of slit valve assemblies 130b, 130c, 130d are disposed in chamber walls 132b, 132c, 132d, respectively, that form a boundary between the handling chamber 102 and the other processing chambers 106b, 106c, 106d, respectively. Similarly, a slit valve assembly 130e is disposed in a chamber wall 132e that forms a boundary between the handling chamber 102 and the loading/unloading chamber 104. The slit valve assemblies 130a–130e permit the wafer 108 to pass through the walls 132a–132e, respectively, of the handling chamber 102 into the chambers 106a, 106b, 106c, 106d and 104, respectively. Typically, the wafer handling chamber 102 is evacuated during the wafer handling process by a vacuum pump (not shown).

In operation, a stack of wafers (not shown) is placed within the loading/unloading chamber 104, and the slit valve assembly 130e is opened to permit the handler 110 to remove one or more of the wafers from the loading/unloading chamber 104, The slit valve 130e is then closed and the handling chamber 102 is evacuated.

A slit valve assembly to one of the processing chambers 106a–106d is opened to permit the wafer 108 to be placed on a wafer support or pedestal 134a–134d, respectively, disposed in the processing chamber. As an example of a multiple processing operation, the wafer 108 is initially provided with an oxide layer and is then etched. Thus, in the initial step, the wafer 108 is to be placed in, for example, chamber 106a which is an oxide CVD chamber. Slit valve 130a is opened and the handler 110 passes the wafer 108 through the opening and places it on the pedestal 134a. Slit valve 130a is then closed and the CVD process is performed. After the completion of the CVD process, the slit valve 130a is opened and the wafer 108 is removed by the handler 110 and the slit valve 130a is closed. In the next processing step, the wafer 108 is etched in a reactive ion etch (RIE) chamber. If chamber 106b is an RIE chamber, slit valve 130b is opened, the handler 110 places the wafer 108 on the pedestal 134b, and the slit valve 130b is closed. After the RIE process is performed, the slit valve 130b is reopened, the handler 110 removes the wafer 108, and the slit valve 130b is closed. After the wafer 108 has been completely processed and it is returned to the loading/unloading chamber 104.

FIG. 2 is a partial sectional view of the semiconductor processing system 100 taken along line 2—2 of FIG. 1. The handling chamber 102 includes a top wall 202 and a bottom wall 204 in addition to the aforementioned pentagonally arranged side walls 132a through 132e. The motor assembly 114 of the handler 110 is supported by the bottom wall 204. Gasses, such as air, nitrogen, etc. can be released into the handling chamber 102 from a gas source 206, via a gas inlet port 208 in the top wall 202, and gasses can be evacuated from chamber 102 by means of a vacuum pump 210, via a similarly situated gas outlet port 212. It should be noted that for simplicity the second slit valve assembly 130b is not shown in the background of the figure.

The processing chamber 106a has side walls 214, 216, and 218, a top wall 220 and a bottom wall 222, and can be completely isolated from the ambient environment. Corrosive process gases such as fluorine can be released into the processing chamber 106a from a gas source 224, via a gas inlet port 226 in its top wall 220, and the chamber 106a can be evacuated by a vacuum pump 228, via a similarly situated gas outlet port 230.

The conventional slit valve assembly 130a includes a valve seat 232 and a closure or valve door 234. A horizontally elongated wafer aperture 237 is provided through walls 218, 132a and the valve seat 232, and is adapted to allow passage therethrough of a wafer 108 held in a horizontal orientation.

FIG. 3A illustrates the conventional slit valve assembly 130a in greater detail. As mentioned previously, the slit valve assembly includes the valve seat 232 and the closure 234. The seat 232 extends through the wall 132a and forms the aperture 237. The seat 232 further includes a sealing face 302, an inner top wall 304, and an inner bottom wall 306. The sealing face 302 of the valve seat 232 lies in a sealing plane P1 which is angularly disposed relative to a wafer transfer plane P2. A typical included angle $\phi$, between planes P1 and P2, is 45°. The aperture 237 has a minor, vertical axis $A_{W1}$ which is perpendicular to the wafer transfer plane P2, and a major, horizontal axis $A_{W2}$ which is parallel to the wafer transfer plane P2, and which is shown extending into the plane of the paper of the figure. Aperture 237 should have a height sufficient to permit a wafer 108 and a wafer support blade 116 to extend through the aperture 237 without contacting the inner top wall 304 or the inner bottom wall 306 of the valve seat 232. The valve seat 232 is typically made from a process-compatible material such as aluminum.

The closure 234 is an elongated, rectangular, planar structure adapted to engage the face 302 of the valve seat 232 in a sealing configuration. The sealing face 309 of the closure 234 is disposed parallel to the sealing plane P1 and thus to the sealing face 302 of the valve seat 232. The closure 234 is made from a process-compatible material such as aluminum.

Closure 234 is in mechanical communication with an actuator assembly (not shown) through a shaft 215. Operation of the actuator assembly causes shaft 215 and closure 234 affixed thereto to retract to allow passage of a wafer through aperture 237 of slit valve 130a. Alternatively, operation of the actuator assembly causes shaft 215 and closure 234 affixed thereto to extend to seal slit valve 130a.

Closure 234 includes, as illustrated in FIG. 3A, a sealing face 309 having a sealing member 310 bonded thereto. FIG. 3B shows a front view of conventional closure 234. As closure 234 extends into contact with seat 232, sealing member 310 contacts sealing face 309 and is compressed, thereby ensuring a proper seal.

Sealing face 309 also includes a barrier 311 that is circumscribed by sealing member 310. Barrier 311 helps prevent any corrosive material potentially present within aperture 237 from attacking seal 310. Barrier 311 is also flexible in order to accommodate compression of the sealing member during sealing of the closure to the seat.

The flexible properties of the seal and the seal barrier typically mean that these valve elements are formed from non-metals such as elastomeric materials. However, any semiconductor fabrication processes performed by the cluster tool expose the chamber and its contents to highly corrosive environments. For example, plasma-based etching processes may involve the generation of highly reactive fluorine species.

The non-metallic sealing member and seal barrier valve elements may be subject to erosion upon exposure to the harsh environment of the processing chamber. FIG. 3A shows that a direct path 390 lies between plasma within processing chamber 106a, and upper portion 234a of closure 234, including upper portions 310a and 311a of seal 310 and barrier 311, respectively. This direct line of sight can give rise to erosion of seal or barrier portions 310a and 311a, ultimately resulting in possible degradation of the airtight seal afforded by the slit valve.

Because the slit valve is positioned between active areas of the tool, its maintenance/replacement is expensive and time-consuming. Accordingly, methods and structures for reducing erosion of slit valves are desirable.

SUMMARY OF THE INVENTION

Embodiments of the present invention provide structures for reducing erosion of a slit valve utilized in the fabrication of semiconductor devices. Specifically, non-metallic slit valve components such as a seal and seal barrier that assist in sealing the valve closure against the valve seat, are positioned on the valve seat rather than on the closure. This orientation removes the sealing member and the barrier from the direct line of sight of plasma within the processing chamber, reducing exposure of the sealing member and seal barrier slit valve components to the plasma and corrosive gases and thereby extending the lifetime of the valve.

An embodiment of a slit valve in accordance with the present invention comprises a valve seat defining an aperture in a wall of a processing chamber, the valve seat configured to receive a semiconductor wafer and including a sealing face inclined at an angle relative to a plane of a major axis of the aperture. A compressible sealing member is positioned on the sealing face for engaging a moveable closure.

An embodiment of a semiconductor processing apparatus in accordance with the present invention comprises a processing chamber defined by side walls, a top wall, and a bottom wall, and a wafer support housed within the processing chamber. A process gas inlet port is in communication with the processing chamber and with a processing gas source. The semiconductor processing apparatus further includes comprises a slit valve comprising a valve seat defining an aperture in one wall of the processing chamber, wherein the aperture is sized so that a semiconductor wafer can be transferred therethrough. A sealing face of the valve seat is inclined at an angle relative to a plane of a major axis of the aperture, and a compressible sealing member is positioned on the sealing face. A closure is moveable against the compressible sealing member to selectively seal and unseal the aperture.

An alternative embodiment of a semiconductor processing apparatus in accordance with the present invention comprises a load lock chamber for receiving a semiconductor wafer, a processing chamber defined by side walls, a top wall, and a bottom wall, and a wafer support housed within the processing chamber. The semiconductor processing apparatus further includes a slit valve comprising a valve seat defining an aperture in one wall of the processing chamber, wherein the aperture is sized so that a semiconductor wafer can be transferred therethrough. The slit valve further comprises a sealing face of the valve seat inclined at an angle relative to a plane of a major axis of the aperture, and a compressible sealing member positioned on the sealing face. A closure is moveable against the compressible sealing member to selectively seal and unseal the aperture. A central transfer chamber houses a robot configured to transfer the wafer from the load lock chamber to the wafer support through the slit valve.

These and other embodiments of the present invention, as well as its features and some potential advantages are described in more detail in conjunction with the text below and attached figures.

BRIEF DESCRIPTION OF THE DRAWINGS

FIG. 1 is a plan view of a prior art multiple chamber semiconductor processing system 100.

FIG. 2 is a partial sectional view of the semiconductor processing system of FIG. 1.

DESCRIPTION OF THE SPECIFIC EMBODIMENTS

Embodiments of the present invention provide structures and methods for reducing erosion of a slit valve utilized in the fabrication of semiconductor devices. Specifically, non-metallic slit valve components such as compressible sealing members and seal barriers that assist in sealing the closure against the seat, are positioned on the valve seat rather than on the closure. This orientation removes the sealing member and the seal barrier from direct line of sight of the plasma of the processing chamber, reducing exposure of the seal and barrier components to erosion and thereby extending the lifetime of the valve.

Figure 4A:
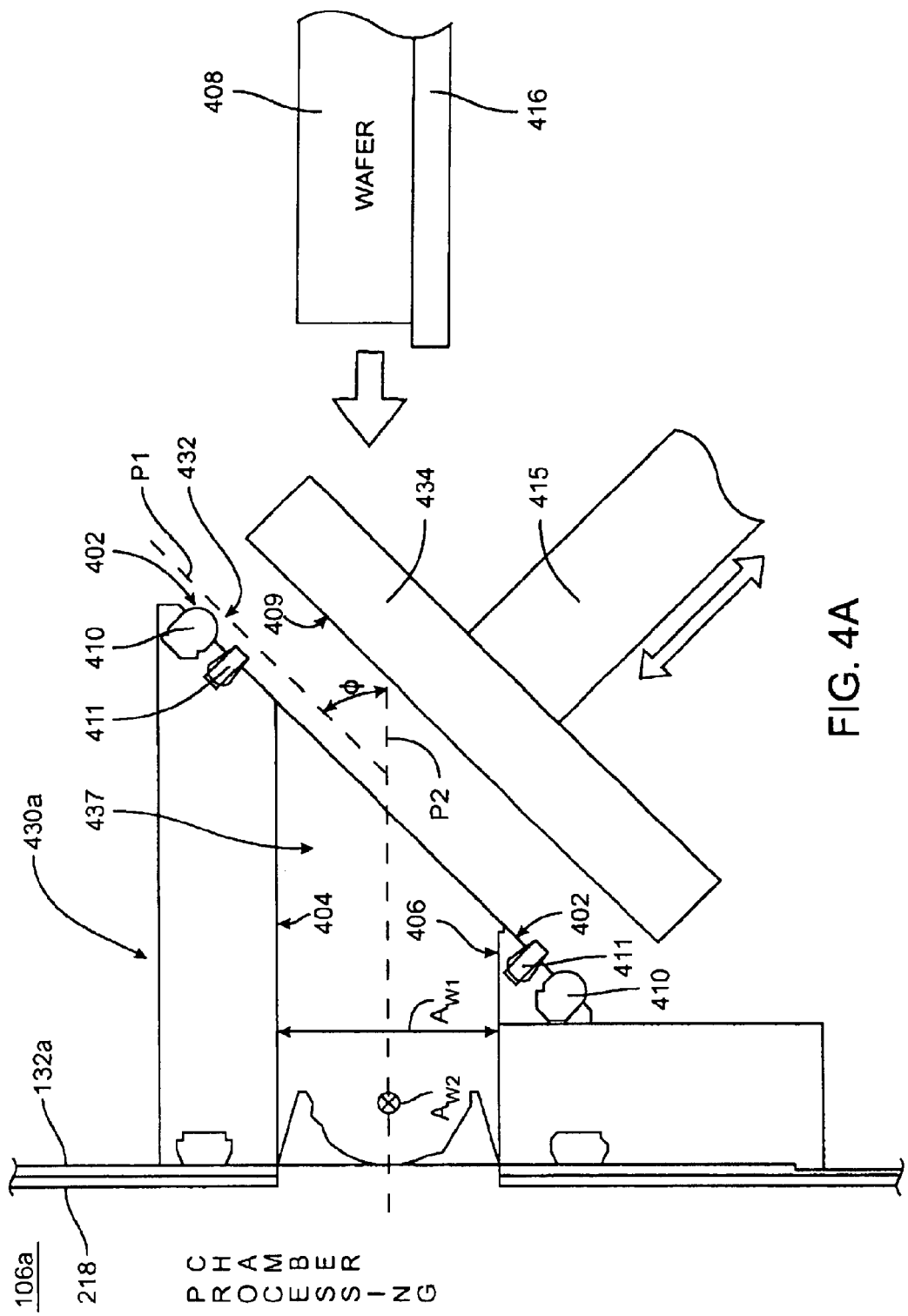
FIG. 4A is an enlarged cross-sectional view of a slit valve in accordance with one embodiment of the present invention.
Figure 3B:
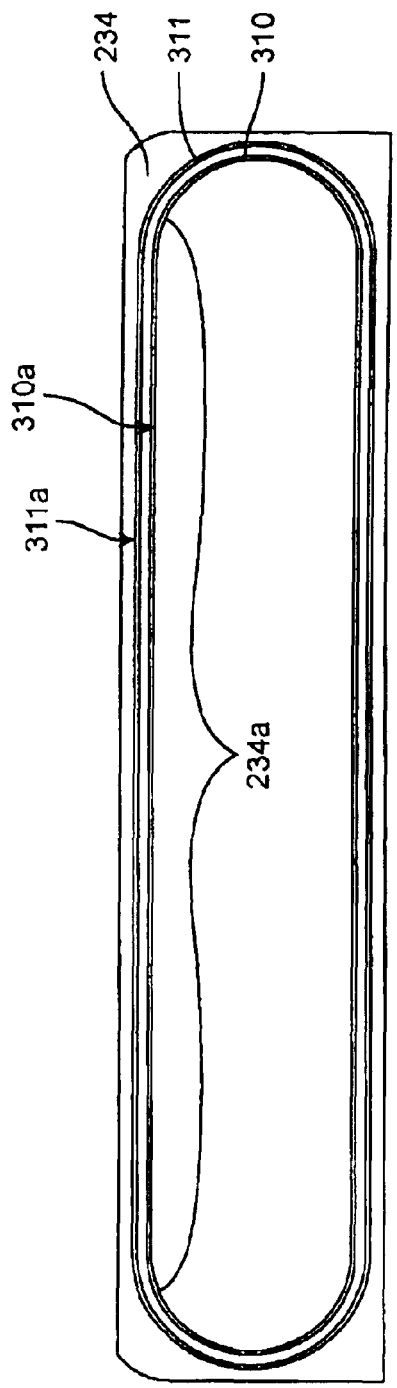
FIG. 3B is a front view of the closure of the conventional slit valve assembly.
Figure 4B:
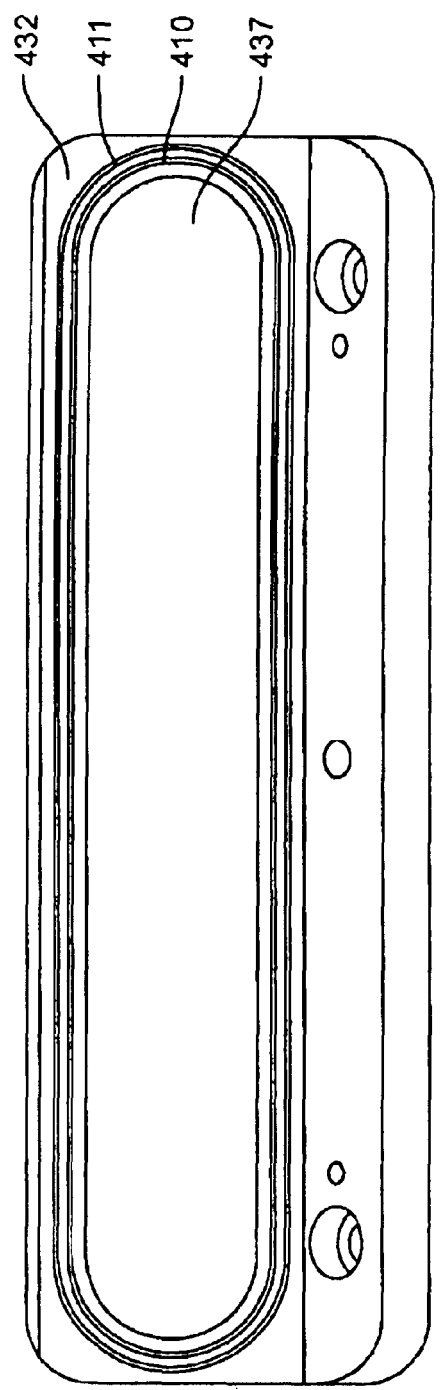
FIG. 4B is a front view of the valve seat of the slit valve in accordance with the present invention shown in FIG. 4A.

FIG. 4A shows a cross-sectional view of one embodiment of a slit valve in accordance with the present invention. The slit valve assembly 430a includes a valve seat 432, a shaft 415 in mechanical communication with an actuator assembly (not shown), and a closure or valve door 434 affixed to shaft 415. A horizontally elongated wafer aperture 437 is provided through walls 218, 132a and the valve seat 432, and is adapted to allow passage therethrough of a wafer 408 held in a horizontal orientation.

The seat 432 extends through the wall 432a and forms the aperture 437. The seat 432 further includes a sealing face 402, an inner top wall 404, and an inner bottom wall 406. The sealing face 402 of the valve seat 432 lies in a sealing plane P1 which is angularly disposed relative to a wafer transfer plane P2. A typical included angle φ, between planes P1 and P2, is 45°. The aperture 237 has a minor, vertical axis $A_{W1}$ which is perpendicular to the wafer transfer plane P2, and a major, horizontal axis $A_{W2}$ which is parallel to the wafer transfer plane P2, and which is shown extending into the plane of the paper of the figure. Aperture 437 should have a height sufficient to permit a wafer 408 and a wafer support blade 416 to extend through the aperture 437 without contacting the inner top wall 404 or the inner bottom wall 406 of the valve seat 432. The valve seat 432 is typically made from a process-compatible material such as aluminum.

Figure 3A:
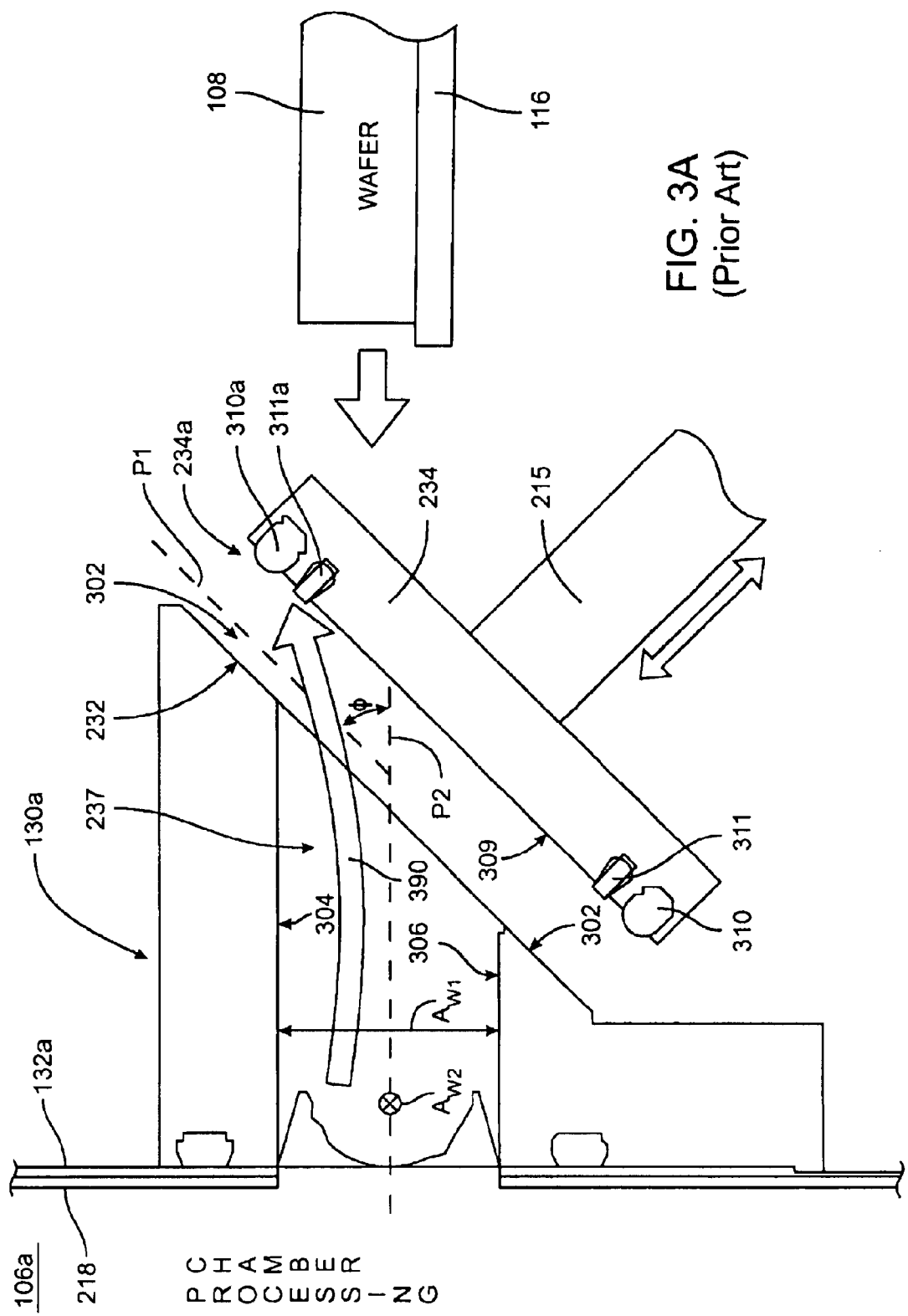
FIG. 3A is an enlarged cross-sectional view of the conventional slit valve assembly.

The closure 434 is an elongated, rectangular, planar structure adapted to engage the face 402 of the valve seat 432 in a sealing configuration. Unlike the conventional slit valve illustrated in FIG. 3A however, the closure 434 in accordance with embodiments of the present invention does not bear any compressible sealing members or barriers to assist in sealing of the valve.

Instead, seal 410 and barrier 411 are positioned on sealing face 402 of valve seat 432. Accordingly, when the actuator assembly causes shaft 415 and closure 434 affixed thereto to extend into contact with seat 432, seal 410 and barrier 411 engage and are compressed by closure 434 in order to afford an airtight seal for the valve.

Because seal 410 and barrier 411 have been relocated to sealing face 402 of seat 432, seal 410 and barrier 411 are now out of the direct line of sight of plasma present in processing chamber 106a. Thus shielded from exposure to plasma by valve seat 432, seal 410 and barrier 411 exhibit reduced erosion and longer lifetimes.

A sealing member in accordance with embodiments of the present invention may be formed from a variety of materials. Examples of a candidate materials for forming a sealing member include but are not limited to CHEMRAZ® E-38, 513, and 520 materials manufactured by Greene, Tweed & Co. of Kulpsville, Pa., and KALREZ® Sahara 8575, 8475, 8375, 8385, and KALREZ® 4079 materials manufactured by Du Pont Dow Elastomers of Wilmington, Del. The sealing member may be physically bonded to the valve seat through the application of heat and pressure, or may be physically fixed to the valve seat by placement within a notch, groove, or other feature.

A seal barrier in accordance with embodiments of the present invention may also be formed from a variety of materials. Examples of candidate materials for forming the seal barrier include TEFLON® and VESPEL®, both manufactured by Du Pont of Wilmington, Del. The barrier may be physically bonded to the valve seat through the application of heat and pressure, or may be physically fixed to the seat by placement within a notch, groove, or other feature.

In addition to offering a longer lifetime than a conventional slit valve, a slit valve in accordance with an embodiment of the present invention also requires less maintenance. Specifically, conventional slit valves may require time-consuming positioning of the closure relative to the valve seat to ensure proper alignment between the valve seat and sealing portions of the closure. With embodiments in accordance with the present invention however, the closure/valve seat alignment process may be significantly less exacting, as the blank closure is merely required to fit against a sealing member on the valve seat and already aligned to the aperture.

While the invention has been described so far in connection with a slit valve employing a sealing member oriented around a seal barrier, the invention is not limited to this particular configuration. Alternative embodiments could employ other types of sealing configurations and the resulting method or apparatus would fall within the scope of the present invention.

Only certain embodiments of the present invention are shown and described in the instant disclosure. One should understand that the present invention is capable of use in various other combinations and environments and is capable of changes and modification within the scope of the inventive concept expressed herein.

Given the above detailed description of the present invention and the variety of embodiments described therein, these equivalents and alternatives along with the understood obvious changes and modifications are intended to be included within the scope of the present invention.

What is claimed is:

1. A slit valve comprising:
   a valve seat defining an aperture in a wall of a processing chamber, wherein the aperture is sized so that a semiconductor wafer can be transferred therethrough;
   a sealing face of the valve seat inclined at an angle relative to a plane of a major axis of the aperture; and
   a compressible sealing member positioned on the sealing face for engaging a moveable closure.

2. The slit valve of claim 1 wherein the compressible sealing member comprises an O-ring positioned around the aperture.

3. The slit valve of claim 1 wherein the compressible sealing member is formed from an elastomer material.

4. The slit valve of claim 1 wherein:
the sealing member is composed of a material selected from the group consisting of CHEMRAZ® E-38, 513, and 520 materials, and KALREZ® Sahara 8575, 8475, 8375, 8385, and KALREZ® 4079 materials; and
the barrier is composed of a material selected from the group consisting of TEFLON® and VESPEL®.

5. A semiconductor processing apparatus comprising:
a processing chamber defined by side walls, a top wall, and a bottom wall;
a wafer support housed within the processing chamber;
a process gas inlet port in communication with the processing chamber and with a processing gas source;
a slit valve comprising,
a valve seat defining an aperture in one wall of the processing chamber, wherein the aperture is sized so that a semiconductor wafer can be transferred therethrough,
a sealing face of the valve seat inclined at an angle relative to a plane of a major axis of the aperture, and
a compressible sealing member positioned on the sealing face; and
a closure moveable against the compressible sealing member to selectively seal and unseal the aperture.

6. The semiconductor processing apparatus of claim 5 wherein the compressible sealing member comprises an O-ring positioned around the aperture.

7. The semiconductor processing apparatus of claim 5 wherein the compressible sealing member is formed from an elastomer material.

8. The semiconductor processing apparatus of claim 5 wherein:
the sealing member is composed of a material selected from the group consisting of CHEMRAZ® E-38, 513, and 520 materials, and KALREZ® Sahara 8575, 8475, 8375, 8385, and KALREZ® 4079 materials; and
the barrier is composed of a material selected from the group consisting of TEFLON® and VESPEL®.

9. A semiconductor processing apparatus comprising:
a load lock chamber for receiving a semiconductor wafer;
a processing chamber defined by side walls, a top wall, and a bottom wall;
a wafer support housed within the processing chamber;
a slit valve comprising,
a valve seat defining an aperture in one wall of the processing chamber, wherein the aperture is sized so that a semiconductor wafer can be transferred therethrough,
a sealing face of the valve seat inclined at an angle relative to a plane of a major axis of the aperture, and
a compressible sealing member positioned on the sealing face;
a closure moveable against the compressible sealing member to selectively seal and unseal the aperture; and
a central transfer chamber housing a robot configured to transfer the wafer from the load lock chamber to the wafer support through the slit valve.

10. The semiconductor processing apparatus of claim 9 wherein the compressible sealing member comprises an O-ring positioned around the aperture.

11. The semiconductor processing apparatus of claim 9 wherein the compressible sealing member is formed from an elastomer material.

12. The semiconductor processing apparatus of claim 9 wherein:
the sealing member is composed of a material selected from the group consisting of CHEMRAZ® E-38, 513, and 520 materials, and KALREZ® Sahara 8575, 8475, 8375, 8385, and KALREZ® 4079 materials; and
the barrier is composed of a material selected from the group consisting of TEFLON® and VESPEL®.

* * * * *